Figure 1:
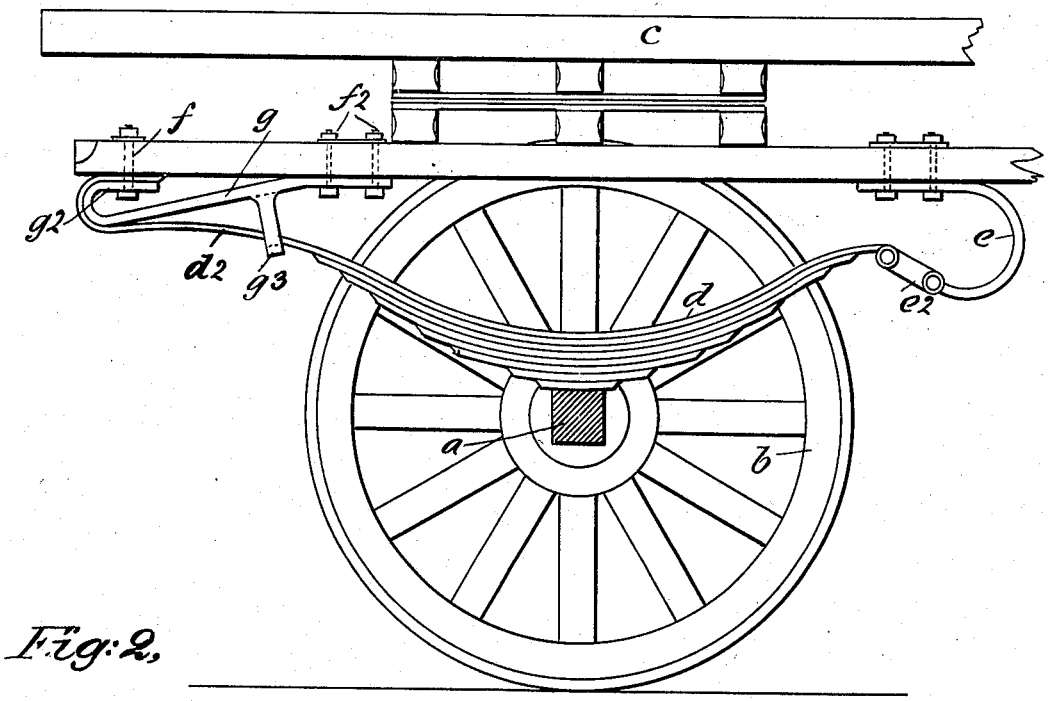

No. 873,325. PATENTED DEC. 10, 1907.
P. J. McGINN.
SPRING FOR VEHICLES.
APPLICATION FILED AUG. 7, 1906.

WITNESSES
Ernest W. Magn
C. E. Mulreany

INVENTOR
Patrick J. McGinn
BY Edgar Tate & Co.
ATTORNEYS.

UNITED STATES PATENT OFFICE.

PATRICK JOSEPH McGINN, OF SALISBURY, RHODESIA.

SPRING FOR VEHICLES.

No. 873,325.      Specification of Letters Patent.      Patented Dec. 10, 1907.

Application filed August 7, 1906. Serial No. 329,549.

*To all whom it may concern:*

Be it known that I, PATRICK JOSEPH MC-GINN, a subject of the King of Great Britain, residing at Salisbury, Rhodesia, South Africa, have invented certain new and useful Improvements in Springs for Vehicles, of which the following is a specification, such as will enable those skilled in the art to which it appertains to make and use the same.

This invention relates to springs for vehicles and particularly vehicles adapted to carry heavy loads and which are provided with bodies or bed which normally rest on heavy springs; and the object of this invention is to provide springs of this class with supplemental springs which support the body or bed, when the vehicle is not loaded, above the main heavy springs so as to prevent jolting and jarring when the vehicle is not loaded.

When vehicles of this class are provided with heavy and strong springs by which the body or bed is supported, said springs are practically useless when the vehicle is not loaded, and when the vehicle passes over rough roads, or the wheels thereof strike an obstruction there is a jolt, jarring and noise such as would be produced if no springs were employed, but with my improvement in which light supplemental springs are employed which support the body or bed above the main springs when the vehicle is not loaded, all these objections are avoided, the body or bed being normally supported when not loaded by the light supplemental springs and being supported when loaded by the main springs with which the vehicle is provided.

The invention is fully disclosed in the following specification, of which the accompanying drawing forms a part, in which the separate parts of my improvement are designated by suitable reference characters in each of the views, and in which;—

Figure 2:
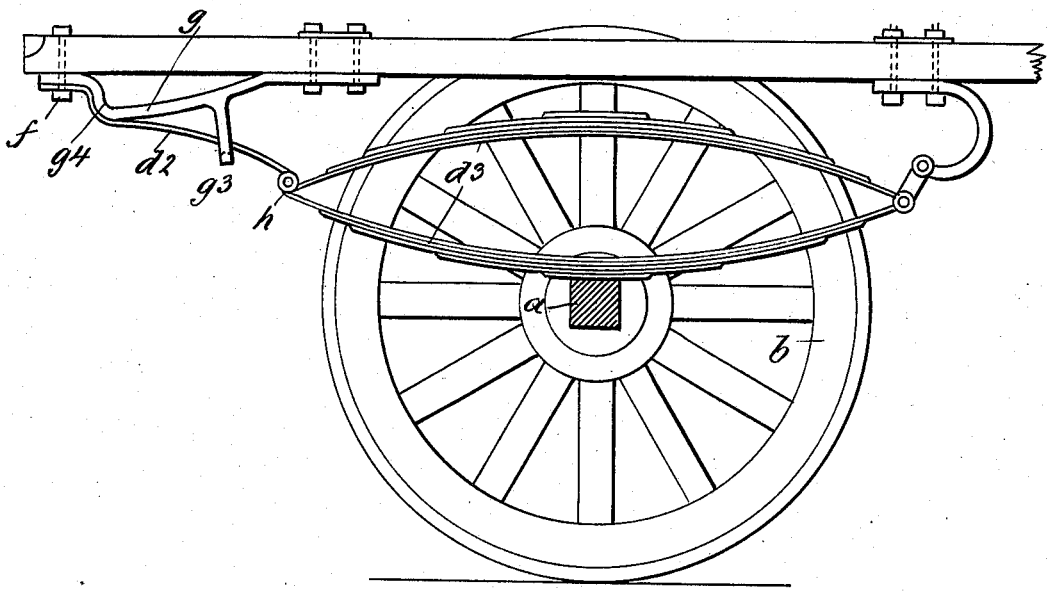

Figure 1 is a side view of a vehicle provided with my improvement; and, Fig. 2 a similar view showing a modified form of construction.

In the drawing forming part of this specification I have shown one of the trucks of a vehicle or a part thereof comprising an axle $a$, a wheel $b$ mounted thereon and a part of the body or bed $c$ which is ordinarily supported by leaf springs $d$ mounted on the front and rear axles of the vehicle or in the front and rear trucks; and in Fig. 1 of the drawing I have shown at $d$ an ordinary leaf spring composed of a number of parts, and the top leaf of which is connected at the rear end with a heavy yoke-shaped spring $e$ secured to the bed or body $c$ in the usual or any preferred manner, by means of a link member $e^2$, and in the practice of my invention as shown in Fig. 1 I extend the top member of the leaf spring $d$ to form a front supplemental spring $d^2$ which is connected with the bed or body of the vehicle as shown at $f$.

In connecting the supplemental spring $d^2$ with the bed or body of the vehicle, as shown at $f$ in Fig. 1, I employ a metal bracket attachment $g$ consisting of a plate about the width of the spring $d^2$ bent at one end to form a loop $g^2$ and provided at a predetermined distance from said end with a downwardly directed keeper $g^3$ through which the spring $d^2$ is passed, and the end of the loop $g^2$ and the end of the spring $d^2$ are secured to the bed or body of the vehicle by a bolt at $f$, while the opposite end of the plate from which the bracket attachment is formed is secured to the bed or body of the vehicle or to the bottom rail thereof by means of bolts $f^2$.

There is a gradual inclination of the plate $g$, or of the metal attachment formed therefrom, from the loop $g^2$ to the point at which the opposite end of said plate is secured to the bed or body of the vehicle as shown at $f^2$, and with this form of construction it will be apparent that the bed or body $c$ of the vehicle when said vehicle is not loaded will be supported by the spring or springs $d^2$, and when said vehicle is loaded the spring or springs $d^2$ will be depressed and the weight of the bed or body will rest on the main springs $d$.

When supplemental light springs are employed in this manner, the jolt, jar or strain caused by the wheel or wheels striking an obstruction is taken up by the supplemental spring or springs which gradually and noiselessly close until the weight of the body or bed of the vehicle strike and rests upon the main spring or springs, and it will be understood that when the vehicle is loaded the supplemental spring or springs $d^2$ are depressed and the weight of the body or bed rests on the main springs in the usual manner. The loop shaped link or keeper $g^3$ serves to retain the front supplemental spring in proper position and prevent it being wrenched or twisted while at the same time permitting its free operation.

In the construction shown in Fig. 2 a double or elliptical main spring $d^3$ is employed and the metal plate attachment $g$ by means of which the front supplemental spring $d^2$ is connected with the body or bed of the vehicle is not provided with a loop $g^2$ but is provided with a downwardly directed bend forming a shoulder $g^4$ over which the supplemental spring $d^2$ passes, and the end of the metal plate attachment with which the spring $d^2$ is connected, and said spring, are secured to the body or bed by a bolt $f$ as shown. With this form of construction the end of the front supplemental spring $d^2$ adjacent to the main spring is connected with said main spring by a pivotal device $h$, while the opposite end of the main spring is secured to the body or bed of the vehicle by a construction similar to that shown in Fig. 1.

The front supplemental spring $d^2$ employed in the manner described constitutes the chief feature of my improvement and when used in this manner it bears the pulling strain and serves to lessen the effect of sudden jerks or strain thrown thereon in the forward movement of the vehicle.

It will also be apparent that my improvement is particularly designed for use in connection with heavy vehicles or trucks, but the same may be applied, if desired, to vehicles or trucks designed for medium use.

Having fully described my invention, what I claim as new and desire to secure by Letters Patent, is;—

A vehicle provided with heavy leaf main springs by which the body or bed is supported when weighted, and light supplemental springs connected with the front ends of the main springs and with the body or bed work by means of plates having downwardly curved portions over which the supplemental springs are passed, said plates being also provided rearwardly of said downwardly directed curved portions with keepers through which the supplemental springs are passed, and the rear ends of the main springs being also provided with supplemental springs connected therewith and with the body or bed work of the vehicle.

In testimony that I claim the foregoing as my invention I have signed my name in presence of the subscribing witnesses this 28th day of June 1906.

PATRICK JOSEPH McGINN.

Witnesses:
 CECIL CONDI,
 WILLIAM STREAK HONEY.